United States Patent [19]

Hetrick

[11] Patent Number: 4,739,664
[45] Date of Patent: Apr. 26, 1988

[54] ABSOLUTE FLUID PRESSURE SENSOR

[75] Inventor: Robert E. Hetrick, Dearborn Heights, Mich.

[73] Assignee: Ford Motor Company, Dearborn, Mich.

[21] Appl. No.: 17,291

[22] Filed: Feb. 20, 1987

[51] Int. Cl.⁴ .............................................. G01L 9/08
[52] U.S. Cl. ......................................... 73/704; 73/701
[58] Field of Search ............... 73/704, 703, 702, 32 A, 73/701

[56] References Cited

U.S. PATENT DOCUMENTS

| 3,187,579 | 6/1965 | Ferrau et al. | 73/702 |
| 3,399,572 | 9/1968 | Riordan et al. | 73/704 |
| 3,425,281 | 2/1969 | Barz | 73/702 |
| 4,409,840 | 10/1983 | Roberts | 73/704 |
| 4,455,874 | 6/1984 | Paros | 73/704 |
| 4,628,739 | 12/1986 | Brüggen et al. | 73/32 A |

Primary Examiner—Donald O. Woodiel
Attorney, Agent, or Firm—Peter Abolins; Keith L. Zerschling

[57] ABSTRACT

A pressure sensor uses two fluidically coupled piezo-electrically driven, vibrating cantilever structures, each tuned to the same fundamental resonance frequency. One cantilever, the driver, is electrically driven at resonance and at constant vibrational amplitude. The other cantilever, the receiver, responds due to the gaseous coupling and generates an output signal proportional to pressure.

7 Claims, 2 Drawing Sheets

ABSOLUTE FLUID PRESSURE SENSOR

BACKGROUND OF THE INVENTION

1. Field of the Invention

This invention relates to the measurement of fluid characteristics using two fluidically coupled vibrating cantilevers blades.

2. Prior Art

There are many methods for measuring gaseous pressure including elctrical (ionization gauge), thermal (thermocouple gauge) and mechanical methods. Many of the mechanical methods involve the deflection of a flexible member under the action of a changing pressure coupled with a technique for sensing that deflection. These include Bourdon tubes and a variety of other devices using flexible diaphragms and bellows.

Included in the category of mechanical pressure sensors are those using vibrating elements. Typically, such an element is caused to vibrate at a resonance frequency by piezoelectric or electromagnetic means. As the pressure changes, the restoring force or possibly the damping forces are modified, causing the resonance frequency to change. Using feedback electronics, the vibrator is maintained at a resonance even though the frequency of that resonance is changing. The change in resonance frequency is related to the pressure. Although effective over a restricted range of pressures, these methods generally have a low dynamic range because the resonance frequency is determined by properties of the vibrator as well as the pressure. Thus, as the pressure is reduced below a certain value, the pressure's effect on the frequency falls to zero.

An example of this type of sensor is given by U.S. Pat. No. 4,455,874 to Paros, who describes a force-sensitive resonator mounted in several different ways so that a force is applied to the resonator as pressure is changed, thereby changing the resonance frequency. Additionally, the Paros patent describes a large number of known vibrational structures for pressure sensing. U.S. Pat. No. 4,409,840 to Roberts describes a vibrating cantilever blade which is excited to vibrate. After a temporary excitation, the driving force is stopped and the temporal decay (time constant) of the vibrational amplitude is observed. This time constant is related to the external pressure. However, like those techniques which monitor a frequency shift, the decay is also strongly influenced by structural factors with the result that for pressures in the range where these factors are dominant, sensitivity to pressure is very low. As described in these teachings, many of these vibrational techniques also have a sensitivity to the atomic mass of the gas under consideration. U.S. Pat. No. 3,187,579 to Ferrau et al shows that the vibrational approach also applied to the measurement of liquid pressures.

It would be desirable to have the entire vibrational amplitude of the sensing vibrator device to be a function of gas pressure and to have the device be sensitive over a very wide pressure range. A simple, compact and practical device would also be desirable. These are some of the problems this invention overcomes.

SUMMARY OF THE INVENTION

This invention is an absolute fluid pressure sensor, including two fluidically coupled, piezoelectrically driven, resonantly vibrating cantilever blades. A first cantilever driven blade is driven at its fundamental resonance frequency by an electrical oscillator applied to a ceramic piezoelectric bimorph attached to the blade. A second cantilever receiver blade is positioned in opposition to the first driver blade so that the first and second cantilever blades overlap but remain separated by a small gap which contains the fluid whose pressure is to be sensed. The second cantilever receiver blade is also attached to a ceramic piezoelectric bimorph.

In operation, the first driver blade is excited at the fundamental resonance frequency and maintained at a constant vibrational amplitude using feedback electronics. The second cantilever receiver blade is caused to vibrate by the fluid pushed against it by the first driver blade. Because the resonacne frequencies of the driver and receiver blades are made to be identical, the vibrational amplitude of the receiver blade can be large and comparable to that of the driver blade, provided the blades are sufficiently close. The oscillation of the receiver blade produces an oscillatory voltage output from the piezoelectric bimorph attached to the receiver blade. As the pressure of the fluid is reduced, the fluid coupling between the receiver and driver blades decreases and the electrical response of the piezoelectric bimorph coupled to the receiver blade decreases. In the limit of complete vacuum, the response from the receiver blade goes to zero except for a small signal that results from the mechanical coupling between the blades that arises from the common support for both cantilevers. In this way, the receiver blade response senses the fluid pressure.

The signal associated with the receiver blade is also influenced by the atomic mass of the surrounding fluid. Lighter fluids (e.g. some gases) produce a smaller response than heavier ones. Accordingly, the average atomic mass of the fluid can be determined if the pressure is known by other means.

An advantage of the two cantilever resonant device, in accordance with an embodiment of this invention, is that the entire receiver signal is proportional to pressure resulting in increased range and sensitivity. The device can respond to pressure over a rang of six orders of magnitude. This is substantial range and no readily achieved by currently available sensors.

DETAILED DESCRIPTION OF THE INVENTION

Figure 1:
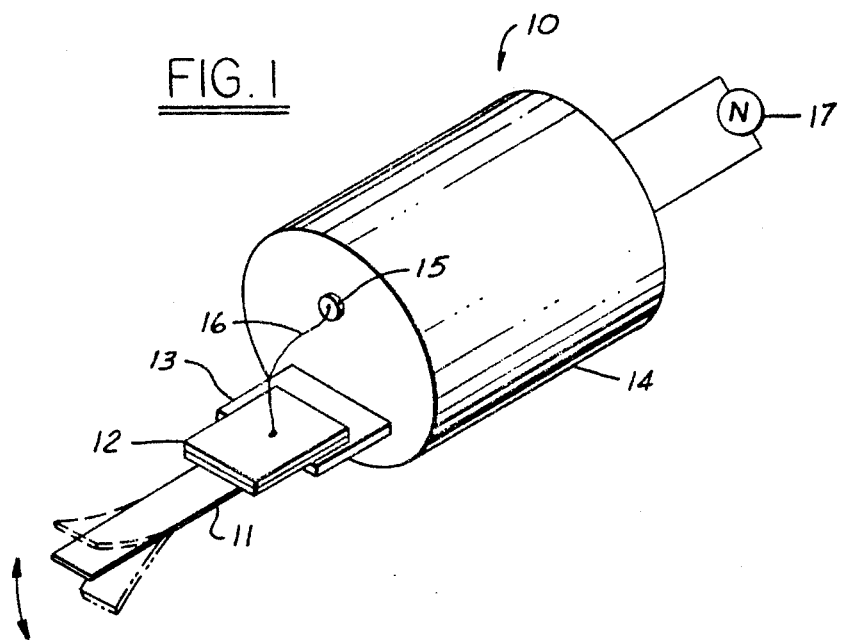
FIG. 1 shows a vibrating cantilever structure in which a vibrating blade is attached to a piezoelectric bimorph which is electrically excited at the fundamental resonance mode of the blade, in accordance with an embodiment of this invention.

A piezoelectrically driven, vibrating cantilever device 10 is shown schematically in FIG. 1. It includes cantilever blade 11 which is attachd to the end of a ceramic piezoelectric bimorph 12 which in turn is attached in a cantilevered manner to an extension 13 of a support structure 14. Structure 14 contains three electrical feedthroughs. Two of these are used for applying an alternating emf to opposite faces of bimorph 12 for the purpose of driving blade 11 at its fundamental resonance frequency. On feedthrough 15 is shown with a lead wire 16 extending to the upper surface of bimorph 12. For convenience, extension 13 to which one face of bimorph 12 is attached can be an electrical conductor that serves as the other feedthrough. A source of oscillating emf 17 attached to these feedthroughs is tuned to the fundamental resonance frequency of the cantilevered structure. That mode is one in which the free end of cantilever blade 11 has a maximum vibrational amplitude while the only node is at the point of support of bimorph 12. For a single blade, the frequency of the fundamental vibrational mode is given by:

$$F = 0.161 \left( \frac{h}{l^2} \frac{E}{\rho} \right)^{\frac{1}{2}}$$

where h is the thickness of a rectangular blade of length l from the free end to the point of constraint. E and $\rho$ are the elastic modulus and density, respectively.

In the present case, the cantilever is acutally a composite of bimorph 12 extending from its rigid support 13 and attached blade 11. As a result, the resonance frequency differs from that given above although the qualitative dependance of resonance frequency on material parameters (e.g., length, elastic modulus, etc.) will be the same as that indicated in the formula. As an example, if the blade is made of one mil thick cold-rolled steel of length 0.5 cm and width 0.15 cm, with somewhat smaller dimensions for the ceramic bimorph (available, for example, from Vernitron Inc.), a typical resonance frequency is 1000 Hz. The Q of the resonance is approximately 50. With a 20 volt (peak-to-peak) excitation, the displacement of the free end of the blade is 1.5 mm (peak-to-peak).

Figure 2:
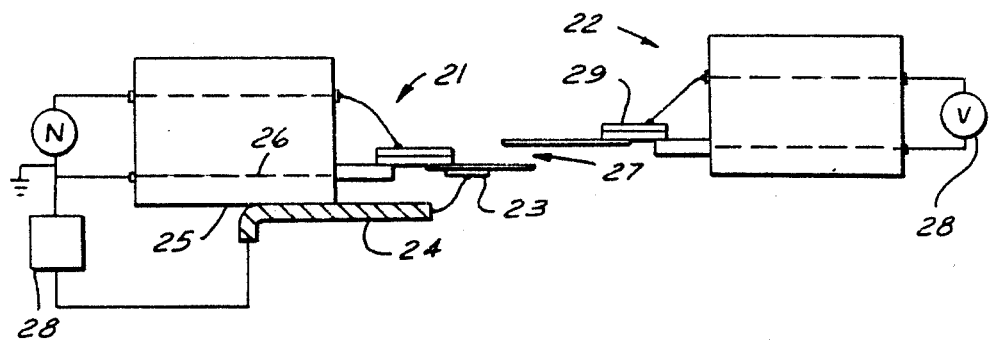
FIG. 2 shows a schematic diagram of a gaseous pressure sensor involving two gaseously coupled vibrating cantilever structures, in accordance with an embodiment of this invention.

FIG. 2 shows a side view of a driver cantilever 21 and a receiver cantilever 22 used as a pressure sensor. The two nearly identical cantilever structures are positioned so that their blades overlap but are separated by a gap 27 of a few millimeters. The cantilevers are adjusted to have identical frequencies for their fundamental resonance mode. If the cantilever components are fabricated to nearly identical size so that their fundamental resonance frequencies are within a few percent of each other, then the frequncies can be brought to nearly identical values (within 0.1%) by adding a small amount of mass to one of the blades.

In operation, driver cantilever 21 is caused to vibrate at resonance and at constant vibrational amplitude. Feedback electronics discussed below are required to achieve this since both the resonance frequency and the amplitude change somewhat with pressure. Receiver cantilever 22 vibrates by virtue of the gas pushed against it by driver cantilever 21. Because the resonance frequency of receiver cantilever 22 is identical with that of driver cantilever 21, its amplitude can become large (comparable to that of the driver) if the separation between the blades is on the order of the dimensions of the blades. The oscillation of the receiver blade produces an oscillatory voltage output (as can be read on volt meter 28) from an attached receiver bimorph 29 proportional to the amplitude of the blade. As the pressure is reduced (increased), the gas-phase coupling between the receiver and driver blades decreases(increases) and the electrical response of the receiver decreases (increases). In the limit of a complete vacuum, the response of the receiver should go to zero. In practice, this may not be true since there may be some residual mechanical coupling between the two cantilevers through a common support which holds both cantilever structures. In this way the receiver response senses the pressure.

Figure 3:
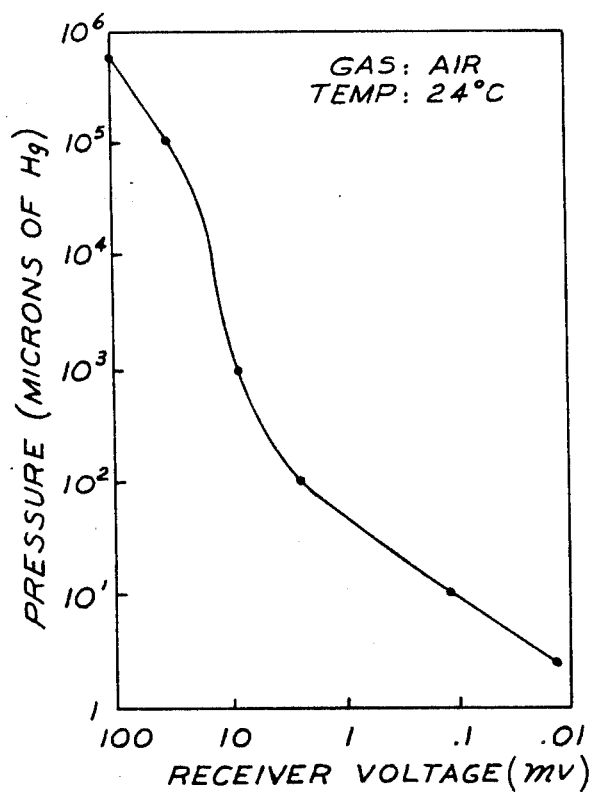
FIG. 3 is a plot of the output voltage of a receiver cantilever structure an mV as a function of atmospheric pressure in microns, with the driver cantilever blade being maintainaed at resonance and vibrating at constant amplitude as the pressure changed.

FIG. 3 shows a plot of the receiver response (abscissa) versus air pressure in micrometers of Hg for a cantilever pair of the dimensions described above. The sensor output is represented by a demodulated DC voltage proportional to the ac receiver bimorph output. Such a sensor has the capability for response over six orders of magnitude of pressure.

In a practical device, the sensing must be automated to continuously generate an electrical signal proportional to the pressure. To implement this, a small piece of polymeric piezoelectric film 23 (such as is available from Pennwalt Corp.) is attached (using, e.g., Ag paste) near the fixed nd of the blade on driver cantilever 21 as shown in FIG. 2. A wire 24 attached to the support structure 25 makes contact to the upper surface of polymeric piezoelectric film 23 while contact to the lower surface is assumed to be made through the blade to the conducting feedthrough 26. Such feedback output from polymeric piezoelectric film 23 is applied to a feedback electronics package 28 which is discussed more fully below. This arrangement does not greatly impede the vibration of the blade. When the blade vibrates, the stretching and contraction of feedback polymeric piezolectric film 23 produces an oscillatory electrical output that is proportional to the amplitude of vibration.

Figure 4:
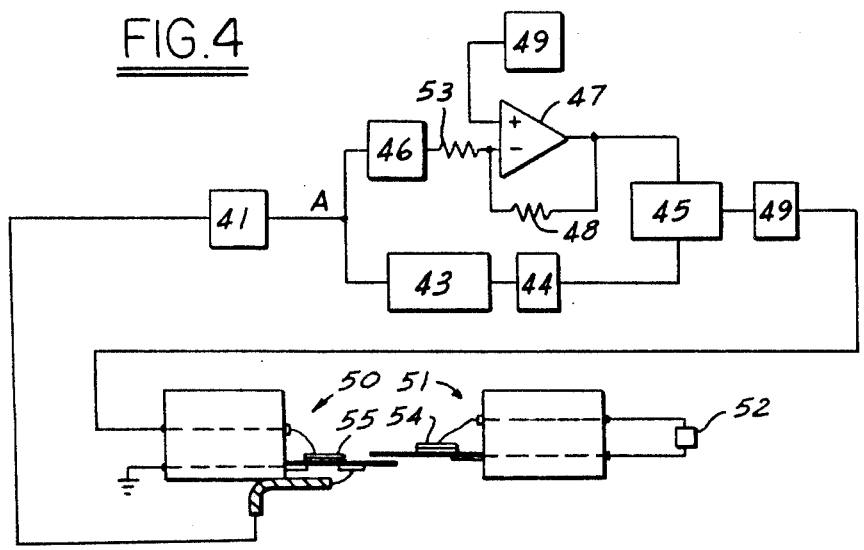
FIG. 4 is a schematic diagram of a feedback electronic circuit designed to maintain a driver cantilever blade vibrating at its fundamental resonance frequency and at a constant amplitude, even though that resonance frequency may vary with ambient conditions.

The signal from feedback piezoelectric film 23 on driver cantilever 21 is fed to the electronic circuitry of FIG. 4. The first element is a preamplifier with filtering 41 to amplify and isolate (within an appropriate frequency band) the signal. The output is split and one portion fed to a phase-locked loop circuit 43. This circuit compares the incoming signal with the oscillatory output of a local oscillator and adjusts (through internal feedback) the frequency and phase of the local oscillator so that it is always 90° out of phase with incoming signal. The output of the local oscillator is amplified by an amplifier 44, whose output is applied to a voltage multiplier 45. Under "locked" conditions, the output of the phase-lockd loop is an ac voltage whose frequency is such that its phase and that of the output from feedback piezoelectric film 23 differ by 90°. This is the condition characteristic of resonance. Thus, if the ceramic bimorph of the driver cantilever is excited at this frequency, the resonance vibration of the cantilever is maintained, even though the resonance frequency may be changing due to varying pressure or changing gases.

It is also necessary to maintain the vibration amplitude of the driven blade at a constant value since vibration amplitude can change significantly with varying pressure. This can be accomplished by sending the other portion of the feedback piezo signal at point A of FIG. 4 to a demodulator 46 containing a full-wave rectifier and low-pass filter. The dc output of the filter (whose magnitude is linearly proportional to the ac amplitide of the feedback signal) is fed through a resistor 53 to one input of another feedback amplifier 47. The other input to feedback amplifier 47 is a reference dc voltage 49 which can be chosen arbitrarily and serves to set the desired vibration amplitide of the cantilever. The output of feedback amplifier 47 is of such a magnitude that, when acting through a feedback resistor 48, it maintains both amplifier inputs at the same value (the reference voltage). The output of feedback amplifier 47 is applied to one input of multiplier 45 whose other input is the arc output of the phase-locked loop circuit. The output of multiplier 45 is applied to amplifier 49 and then used to drive a ceramic bimorph 55 of the driver cantilever. If the vibration amplitude of the blade should vary slightly, the output of amplifier 49 increases or decreases and, through the action of multiplier 45, modifies the ac drive voltage to maintain a constant amplitude. The output of receiver cantilever 51 is sent to signal processing electronics 52. For a calibrated device, the output of a receiver bimorph 54 is compared to values corresponding to a given pressure (e.g., using microprocessor electronics) and the resulting pressure displayed or its electrical equivalent made available for further processing. The data of FIG. 3 were taken under such conditions of resonance and constant driver blade vibration amplitude.

The receiver signal is also influenced by the atomic mass of the gas. Lighter gases produce a smaller response than heavier ones. Accordingly, the average atomic mass can be determined if the pressure is known by other means.

Various modifications and variations will no doubt occur to those skilled in the art to which this invention pertains. For example, methods other than a piezoelectric bimorph can be used to drive the cantilever blade. These would include electromagnetic methods. Similarly, electromagnetic means could be used to acquire the feedback signal. These and all other such variations which basically rely on the teachings through which this disclosure has advanced art are properly considered within the scope of this invention.

I claim:

1. A fluid coupling sensing device for determining the amount of fluidic pressure between a driver cantilever blade structure and a receiver cantilever blade structure, each having substantially the same resonance vibrational frequency, including:
   an electrical source means coupled to said driver cantilever blade structure for electrically exciting said driver cantilever blade structure;
   an electrical sensing means coupled to said receiver cantilever blade structure for sensing vibration of said receiver cantilever blade structure;
   said driver and receiver cantilever blade structures each being generally elongated and planar, and positioned in an overlapping and parallel configuration to each other with a gap separating said driver and receiver blade structures, the order of magnitude of the gap being selected as a function of the amount of fluidic coupling desired between said driver and receiver cantilever blade structures; and
   a feedback means coupled to said driver cantilever blade structure and to said electrical source means for sensing motion of said driver cantilever blade and generating an output signal to be applied to said electrical source means for controlling the frequency and magnitude of vibration of said driver cantilever blade structure under all ambient conditions.

2. A fluid coupling sensing device as recited in claim 1, wherein:
   said driver cantilever blade structure includes an elongated driver blade and a driver pizoelectric bimorph coupled to said driver blade and electrically responsive to said electrical source means.

3. A fluid coupling sensing device as recited in claim 2, wherein:
   said feedback means includes a piezoelectric polymer coupled to said driver cantilever blade for generating a signal as a function of driver blade movement.

4. A fluid coupling sensing device as recited in claim 2 wherein said receiver cantilever blade structure includes an elongated receiver blade and a sensing piezolectric bimorph coupled to said receiver blade for generating a signal as a function of said receiver blade movement, said sensing piezolectric bimorph being coupled to said electrical sensing means.

5. A fluid coupling sensing device as recited in claim 4 wherein said driver blade is electrically conductive and is in electrical contact with said piezoelectric polymer.

6. A fluid coupling sensing device as recited in claim 4 wherein said electrical source means and said feedback means act in coopertion to drive said driver cantilever blade structure at resonance and at constant amplitude for varying ambient conditions of fluid pressure or species.

7. A fluid coupling sensing device, for determining the amount of fluidic prssure, including:
   a driver cantilever blade structure
   a receiver cantilever blade structure, each of said driver and receiver cantilever blade structures having substantially the same resonance vibrational frequency;
   an electrical source coupled to said driver cantilever blade structure for electrically exciting said driver cantilever blade structure;
   said driver cantilever blade structure including an elongated driver blade and a driver piezoelectric bimorph coupled to said driver blade and electrically responsive to said electrical source means;
   said receiver cantilever blade structure including an elongated receiver blade and a sensing piezoelectric bimorph coupled to said reciever blade for generating a signal as a function of said receiver blade movement, said sensing piezoelectric bimorph being coupled to said electrical sensing means;
   an electrical sensing means coupled to said receiver cantilever blade structure for sensing vibration of said receiver cantilever blade structure;
   said driver and receiver cantilever blade structures each being generally elongated and planar, and positioned in an overlapping and parallel configuration to each other with a gap separating said driver and receiver blade structures, the order of magnitude of the gap being selected as a function of the amount of fluidic coupling desired between said driver and reciever cantilever blade structures;
   a feedback means coupled to said driver cantilever blade structure and to said electrical source means for sensing motion of said driver cantilever blade and generating an output signal to be applied to said electrical source means for controlling the frequency and magnitude of vibration of said driver cantilever blade structure under all ambient conditions, said feedback means including a piezolectric polymer coupled to said driver cantilever blade structure for generating a signal as a function of driver blade movement;

said driver blade being electrically conductive and being in electrical contact with said piezoelectric polymer; and said electrical source means and said feedback means acting in cooperation to drive said driver cantilever blade structure at resonance and at constant amplitude for varying ambient conditions of fluid pressure or species.

* * * * *